(12) United States Patent
Niles Peretz et al.

(10) Patent No.: US 8,238,643 B2
(45) Date of Patent: Aug. 7, 2012

(54) METHOD AND SYSTEM FOR CALCULATING WEIGHT OF VARIABLE SHAPE PRODUCT MANUFACTURED FROM PRODUCT BLANK

(75) Inventors: Samuel R. Niles Peretz, Acton, MA (US); Jacob A. Hyman, Cambridge, MA (US); Terence M. Tirrella, Winchester, MA (US)

(73) Assignee: Vistaprint Technologies Limited, Hamilton (BM)

( * ) Notice: Subject to any disclaimer, the term of this patent is extended or adjusted under 35 U.S.C. 154(b) by 462 days.

(21) Appl. No.: 12/607,911

(22) Filed: Oct. 28, 2009

(65) Prior Publication Data
US 2010/0104172 A1 Apr. 29, 2010

Related U.S. Application Data

(60) Provisional application No. 61/109,178, filed on Oct. 28, 2008.

(51) Int. Cl.
*G06K 9/00* (2006.01)
(52) U.S. Cl. ........................................................ 382/141
(58) Field of Classification Search .................. 382/141, 382/143, 152
See application file for complete search history.

(56) References Cited

U.S. PATENT DOCUMENTS

| 6,164,174 A * | 12/2000 | Sigurdsson et al. ............... 83/13 |
| 7,841,264 B2 * | 11/2010 | Kim et al. ........................... 83/13 |
| 8,025,000 B2 * | 9/2011 | Kim et al. ........................... 83/13 |
| 2004/0088267 A1 | 5/2004 | Rasmussen et al. |

FOREIGN PATENT DOCUMENTS
EP 1431725 6/2004
WO WO00-59648 10/2000

* cited by examiner

*Primary Examiner* — Roy M Punnoose
(74) *Attorney, Agent, or Firm* — Jessica J. Costa

(57) ABSTRACT

A computerized system, method, and computer-readable media implementing a method for determining a weight of a product, and optionally its shipping weight and postage are described. A product having a variable shape in two dimensions wherein the shape is defined in the two dimensions by a set of cutlines is manufactured from a product blank of known weight. The weight of the product is determined from the number of pixels in a scaled image of the cutlines, the image having the same aspect ratio as the product blank. The weight of the product blank and the ratio of the pixels corresponding to product surface area relative to the total number of pixels in the image are used to calculated the actual weight of the product.

9 Claims, 16 Drawing Sheets

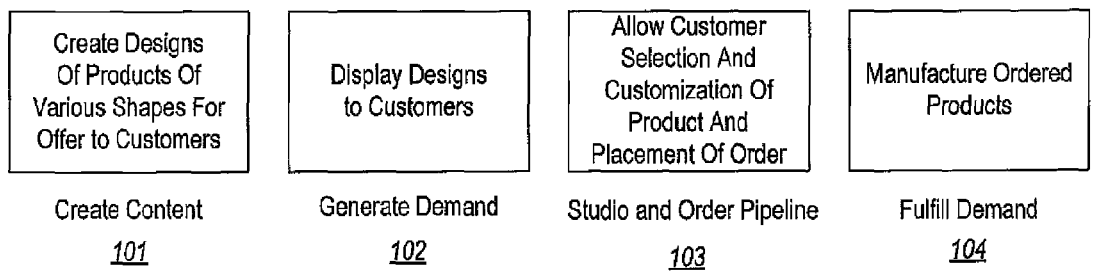
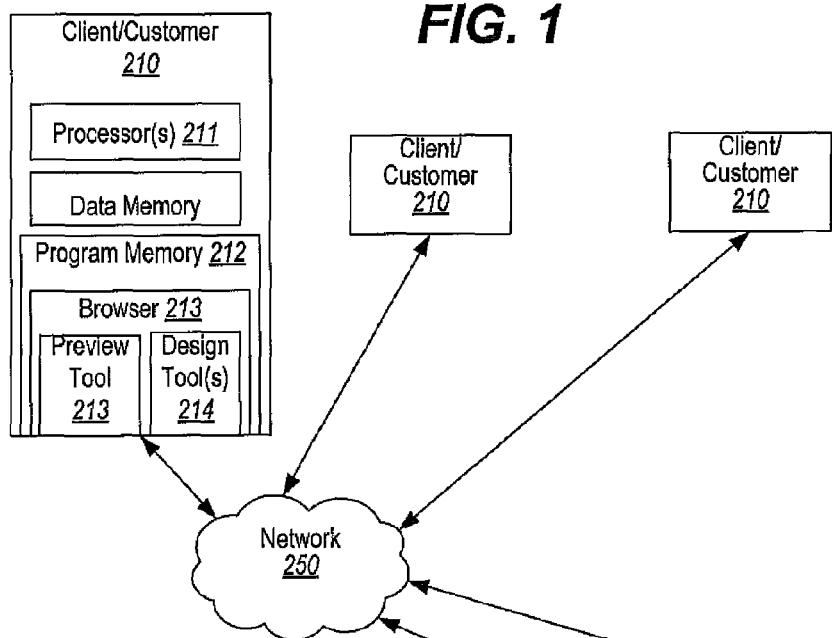
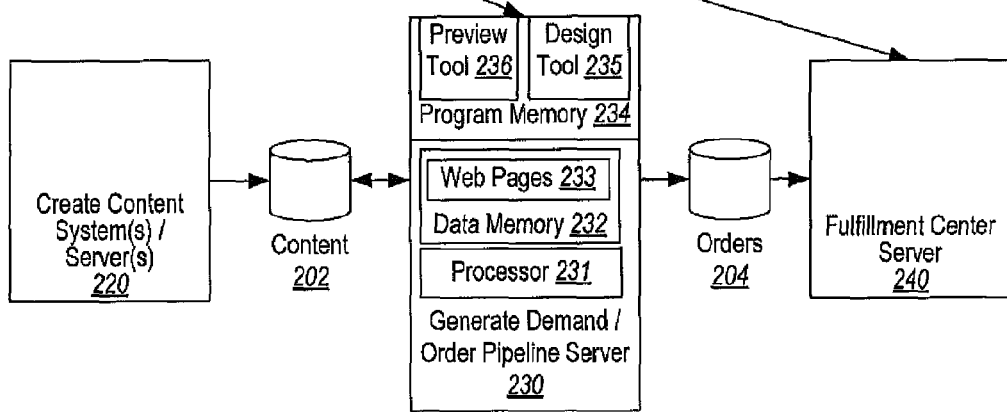

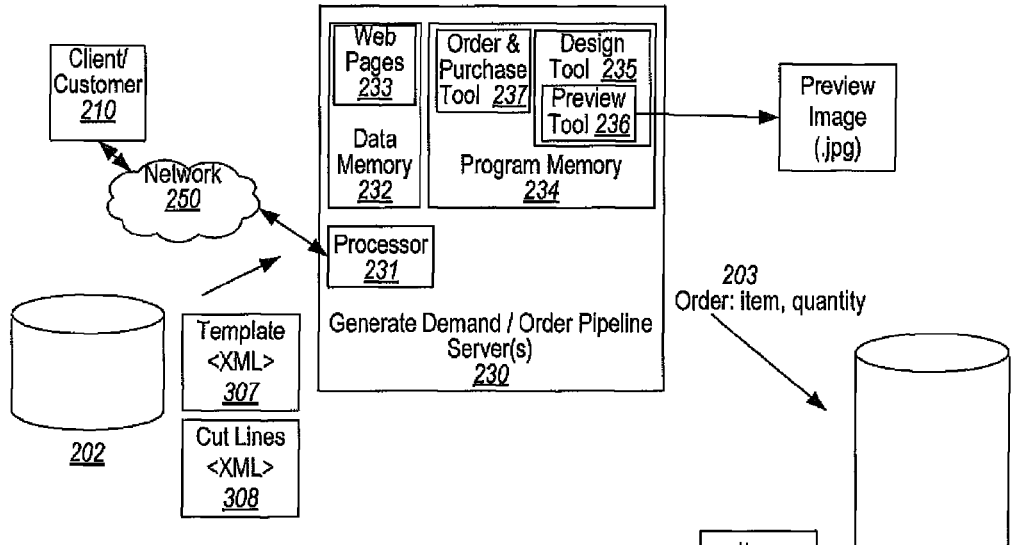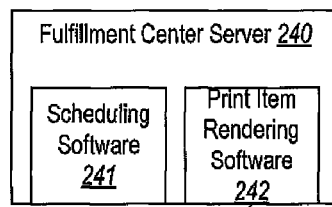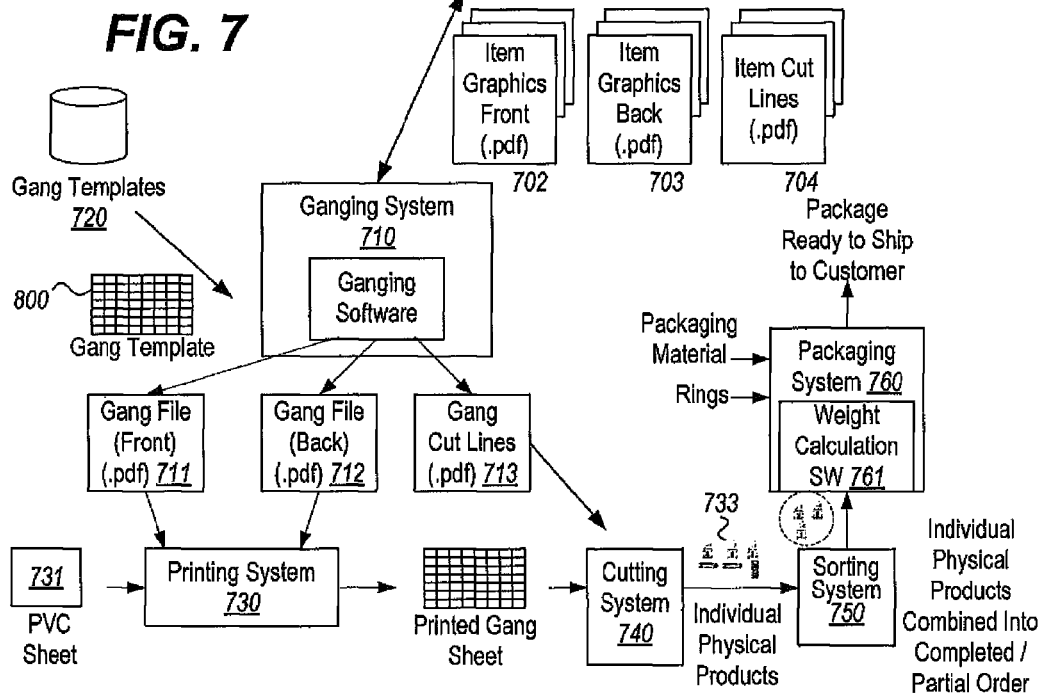
FIG. 7

Inserting Items into Template to Fill Gang (Front)

= Single PDF

Filled Gang (Gang File - Back)

Filled Gang (Gang File – Cut Lines)

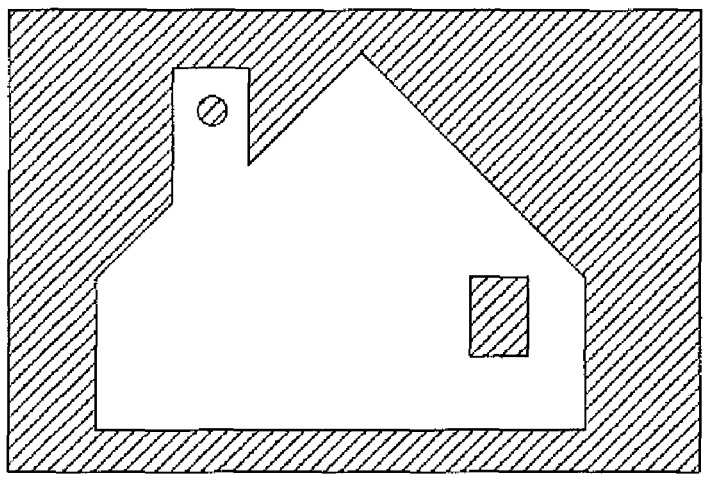
Cutlines
Against
Background
With same
Aspect ratio as
Keychain Blank
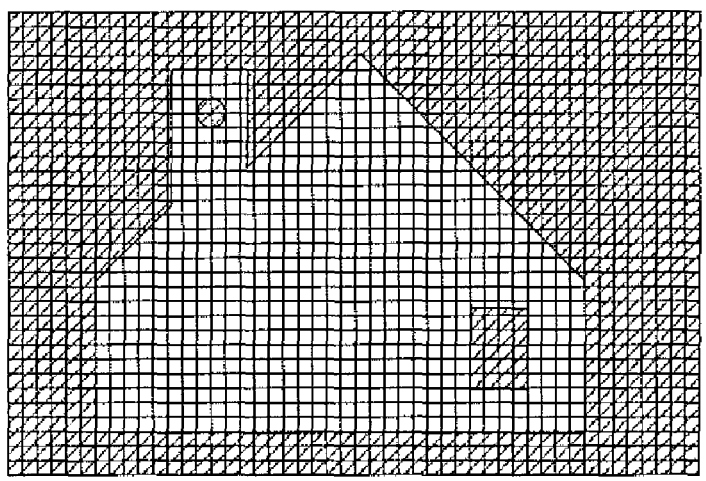
Count Pixels
*FIG. 10B*

1101 — Receive orders for variable shaped items to be manufactured.

1102 — Select set of received items to simultaneously manufacture.

1103 — Render individual print-ready files of print designs associated with selected items.

1104 — Render individual cutter-ready files of cutlines associated with selected items.

1105 — Insert print-ready files into print gang(s).

1106 — Insert cutter-ready files into cutlines gang(s).

1107 — Render print gang.

1108 — Render cutlines gang.

1109 — Send print gang(s) to printer to print gang sheet(s).

1110 — Send cutlines gang(s) to cutter to cut gang sheet(s) into finished products.

*FIG. 12*

1201 — Define markup language description of cutlines defining shape.

1202 — Define markup language description of margin area defining a margin between the defined cutlines and content area within the defined shape.

1203 — Define markup language description of content to be printed.

1204 — Define rules preventing display of content in areas on a display screen outside the defined shape of the item to be manufactured.

1205 — Display cutline indicators and content on display screen according to defined rules.

*FIG. 13*

METHOD AND SYSTEM FOR CALCULATING WEIGHT OF VARIABLE SHAPE PRODUCT MANUFACTURED FROM PRODUCT BLANK

PRIORITY CLAIM

The present application claims the benefit of priority of U.S. Ser. No. 61/109,178 filed Oct. 28, 2008.

INCORPORATION BY REFERENCE

The present application hereby incorporates by reference U.S. Pat. No. 6,650,433, entitled "Managing Print Jobs", issued Nov. 18, 2003, in its entirety and for all that it teaches.

BACKGROUND OF THE INVENTION

The present invention relates generally to manufacturing variable shaped products and more particularly to a method and system for calculating the weight of variable shaped products manufactured from product blanks.

Products such as keychains, mousepads, magnets, sticky notes, cards, etc., may be produced in various shapes. For example, a keychain tag may be offered in a rectangle, an oval, a circle, and/or other shapes that may even be customized to the particular design to be printed, etched, affixed, or otherwise displayed on the substrate of the product. Such variable shaped products are often manufactured from product blanks that come in a standard size and shape and have a fixed weight.

When shipping products of variable weights, the products must be weighed to calculate the correct postage. Since manufactured products may come in various shapes, the fixed weight of the product blank cannot be used to determine the actual weight of the product, and therefore the products must actually be weighed prior to shipment.

It would be desirable to have a system and method that would allow determination of the weight of variable shaped products without having to actually weigh the finished products.

SUMMARY OF THE INVENTION

The present invention is directed at techniques for determining the weights of variable shaped products without actually weighing the products.

In an embodiment, a method for determining a weight of a product having a shape characterized by a variable first dimension and a variable second dimension and a non-variable third dimension, the shape defined in the first and second dimensions by a set of cutlines, is detailed. The method includes the steps of obtaining a weight of a product blank; creating an image having an aspect ratio that matches a corresponding aspect ratio of a product blank in the first and second dimensions, the image scaled to a predetermined scale, the image having pixels corresponding to locations of at least the cutlines defining the variable shape of the product scaled to the predetermined scale, the outlines delineating pixels corresponding to points on the final product and pixels corresponding to areas of the blank to be trimmed from the product blank; determining a ratio of a number of pixels corresponding to product surface area to total number of pixels in the image; and multiplying the determined ratio by the weight of the product blank to determine the weight of the product.

In another embodiment, one or more computer readable storage medium together tangibly embodying program instructions which, when executed by a computer, implement the method described above.

In yet another embodiment, a system includes one or more processors and one or more computer readable media embodying program instructions executed by the one or more processors to implement the method described above.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a high-level flow diagram illustrating an online retail model.

FIG. 2 is a high-level block diagram of an online retail system.

FIG. 7 is a more detailed block diagram of an online print retailer implementing aspects of the invention.

FIG. 10B diagrammatically illustrates the method of FIG. 10A.

FIG. 12 is a flowchart illustrating an exemplary method for producing variable shaped printed products.

FIG. 13 is a flowchart illustrating an exemplary method for defining a variable shaped document for web viewing.

DETAILED DESCRIPTION

Figure 3:
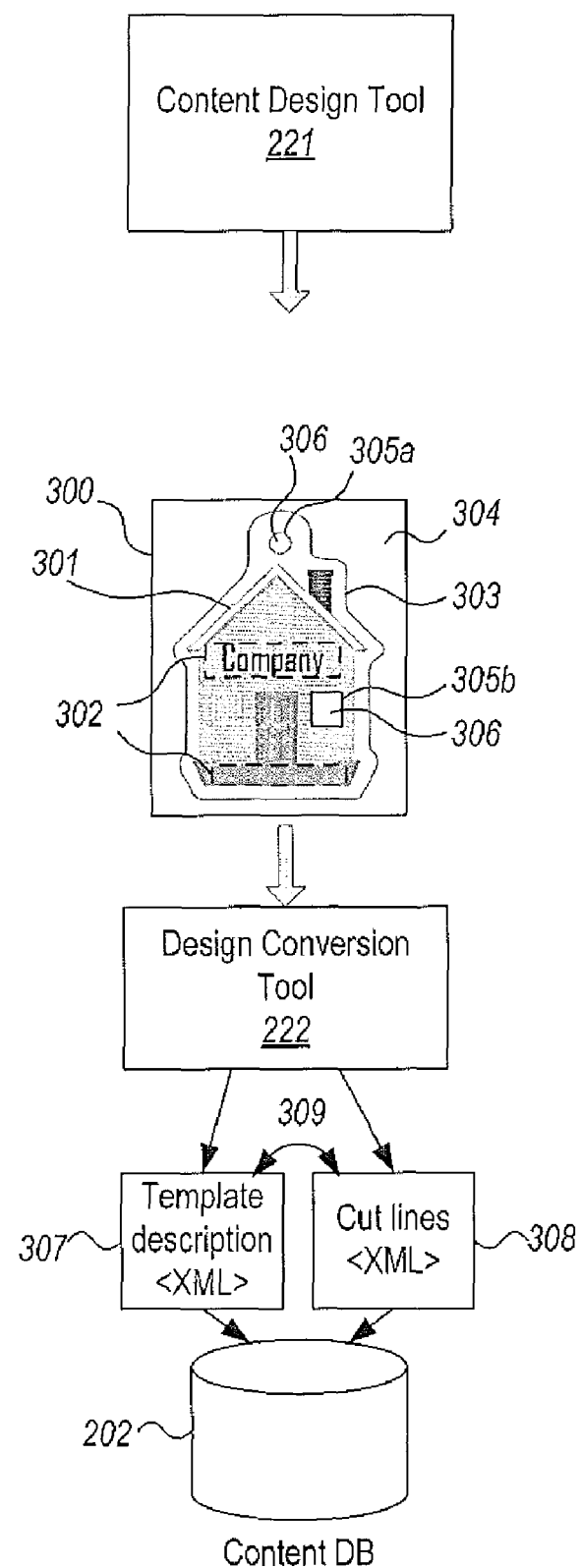
FIG. 3 is an operational diagram illustrating creation of a keychain tag template.

Systems and methods for facilitating the mass production of variable shaped products are presented herein.

FIG. 1 shows a high-level flow diagram illustrating a model for offering, selling and producing products of various shapes through a computerized environment. The model includes a Create Content component 101 whereby content such as designs, graphics, templates, etc. which may later be offered as, or incorporated into other, products of various shapes are created or otherwise obtained. The model further includes a Generate Demand component 102 through which customer interest in products incorporating the content is generated. The Generate Demand component 102 may comprise, for example, web pages of an online retailer's website that display one or more products of various shapes and various designs that may be embodied on the products that are available for is ordering by a customer. The model further includes an Order Pipeline component 103 through which a product is selected and customized by a customer and an order for the product is placed. In an online retailer's website, the Order Pipeline component 103 may comprise design software, discussed hereinafter, that allows the customer to select a product design template and to customize text, image, and/or graphical components of the product design prior to ordering one or more products embodying the design.

The model further includes an Order Fulfillment component 104 which accepts orders from the Order Pipeline component 103 and manufactures or otherwise fills and ships the orders to the customers. In some instances, the Order Fulfillment component 104 includes a warehouse or other storage facility which stores stock products available and ready for shipment. In other instances, the Order Fulfillment component 104 is a manufacturing facility which manufactures the ordered items according to a design specified in the order. In other embodiments, the Order Fulfillment component 104 embodies manufacturing, warehousing, and shipping, and each component may be performed by different business entities owned by the same or different parties. In an embodiment, each of the Create Content component 101, the Generate Demand component 102, the Order Pipeline component 103, and Order Fulfillment component 104 is implemented at least in part using one or more computer systems, for example as illustrated and discussed in connection with FIG. 11.

A system embodying the model of FIG. 1 is shown in FIG. 2. A Create Content system 220, which may be implemented with one or more computer systems or servers (for example as described hereinafter in conjunction with FIG. 11), is used to receive, obtain, generate, and/or otherwise provision a Content database 202 with content such as template descriptions and associated outlines descriptions usable by one or more Generate Demand/Order Pipeline servers 230 to customize and specify customer orders. One or more computer systems (for example as described hereinafter in conjunction with FIG. 11) implement the Generate Demand/Order Pipeline servers 230 to serve pages of an online retailer website in order to generate orders 204 from customers for products. In an embodiment, the products are physical products that may be manufactured in a shape selected by the customer from a set of multiple different available shapes and with content selected and/or personalized by the customer. For example, the product may be a keychain tag printed with customer-selected, and optionally personalized, content and cut to a customer-selected shape. Orders 204 are received by one or more Fulfillment Center server(s) 240 and manufactured according to the specifications of the order.

Each of the Create Content component 101, the Generate Demand component 102, the Order Pipeline component 103, and Order Fulfillment component 104 requires its own implementation considerations. Turning first to the Create Content component 101, the Create Content component 101 encompasses the implementation of content that corresponds to products that can be edited and personalized by remote customers over a network 201 such as the Internet (and then subsequently ordered for manufacture). For any given product, one or more templates are generated by a human designer (typically operating a design tool 214 implemented as software executed by one or more computer processors), or alternatively, a template may be designed and generated automatically by software.

FIG. 3 shows the creation of a keychain tag template 300. As illustrated, a template 300 will typically include some non-editable content 301 that cannot be altered by the customer, such as a graphic (in this case a graphic of a house), and one or more editable content areas 302 that allow a customer to personalize with their specific information. For example, a template 300 for a keychain tag as shown in FIG. 3 may include a non-editable graphic 301 of a house and one or more editable text containers 302 which can be edited by a customer to fill in their own text.

Each physical product is manufactured from a product blank of predefined dimensions. As discussed hereinafter, a product blank may be predefined area of a larger substrate. The finished physical product may comprise the entire blank, in which case content may be printed, engraved, or otherwise affixed or embodied anywhere within the physical boundaries of the blank. Alternatively, the finished physical product may be trimmed or cut to a shape different than the shape of the blank by cutting away portions of the blank according to predefined cutlines. Cutlines are typically defined by a template designed using a content design tool during the Create Content phase of the operation may include outer cutlines 303 whereby portions 304 of the product blank lying outside the outer cutlines 303 are removed from the product blank to thereby defined the outer shape of the finished product. Cutlines may additionally or alternatively include one or more sets of inner outlines 305a, 305b whereby portions 306 of the product blank lying inside the respective set of inner outlines 305a, 305b are removed from the product blank to thereby define an inner shape of a hole or orifice within the finished product.

In order to create content that corresponds to products of various shapes that will be manufactured from blanks of other shapes (for example, from standardized rectangular blanks), a template 300 for a non-standard shape also includes or is otherwise associated with a set of outlines 308 that define either or both of outer outlines 303 defining art outer shape and one or more sets of inner cutlines 305a, 305b that define one or more respective shapes of respective one or more inner holes in the product. For example, the template 300 for the keychain tag with the house graphic 301 shown in FIG. 3 may be offered in a shape outlining the shape of the house graphic. If the shape of the product blank from which the product is to be manufactured does not exactly correspond to the desired shape, then a set of outer cutlines 303 defining the outer shape of the keychain tag (in this case, substantially conforming to the outer shape of the house graphic 301) is specified by the template designer and saved or associated with the template description 307 that described the layout and content of the product design. Likewise, if an inner orifice is desired, for example a keychain hole or another orifice such as a hole in the place of one of the windows of the house graphic), then a set of inner outlines 305a, 305b is defined for each desired orifice and stored with or otherwise associated with the template description 307. In an embodiment, both the template description 307 and the outlines description 308 are stored in a content database in a markup language format such as eXtensible Markup Language (XML) that can be processed by a web browser to render an image of the template on a computer display screen. The template description 307 and the out lines description 308 may be stored in the same file, or may be associated via a link 309 for separate processing.

In an embodiment, a human designer utilizes one or more content design tools 221 (i.e. design software) to specify a template description 307 defining a number and position of all editable images and text containers 302 in the template, any non-editable graphical designs 301 and/or text to be included in the template, a color scheme, a font scheme, and properties of each of the components (such as editable or non-editable). One or more sets of outer and inner outlines 303, 305a, 305b may also be defined using the design tool(s)

221. A Design Conversion Tool 232 may convert or extract a markup language template description file 307 and a markup language cut lines description file 308. The template description file 307 is associated with the cut lines description file 308 and stored in content database 202.

The stored content 202 (i.e., template description files 307 and associated cut lines description files 308) may be provisioned to a server 230 hosting a website. In one embodiment, as illustrated in FIG. 2, the Generate Demand/Order pipeline server 230 serves web pages 233 implementing the retailer's website to customers operating client computer systems 210. A customer interacts with the website through a browser 213 executing from program memory 212 under the control of one or more processors 211. The design and order process is conducted through the website. FIGS. 4A through 4G show a set of webpages presented to a customer to illustrate a flow of an ex website experience.

The online vendor of products may offer products such as keychains, mousepads, magnets, sticky notes, cards, etc., that may be produced in various shapes. For example, a keychain tag may be offered in a rectangle, an oval, a circle, and/or other shapes that may even be customized to the particular design to be printed, etched, affixed, or otherwise displayed on the substrate of the product.

Figure 4A:
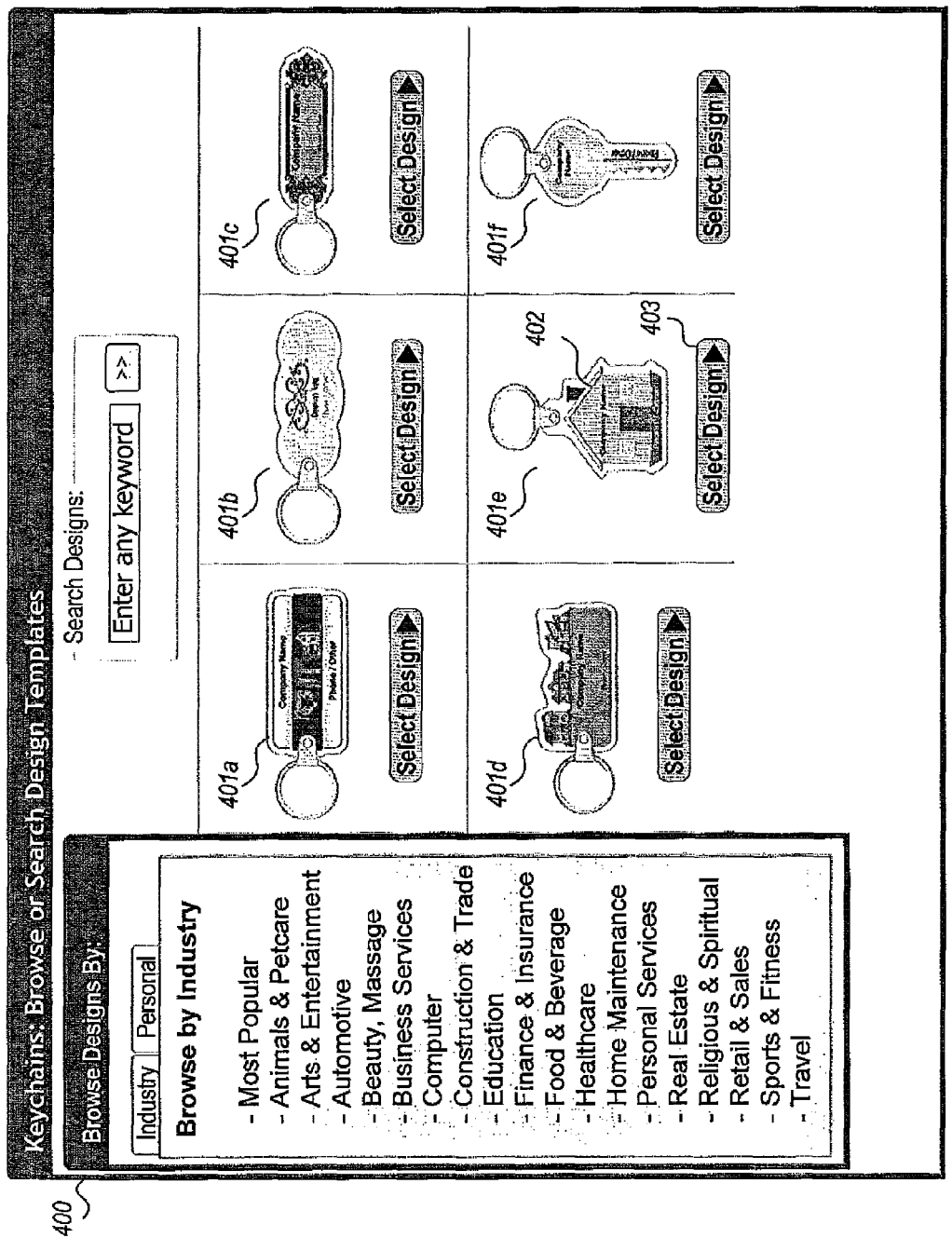
FIGS. 4A-4G illustrates exemplary web pages displayed to a customer during selection and customization of a product.
Figure 4B:
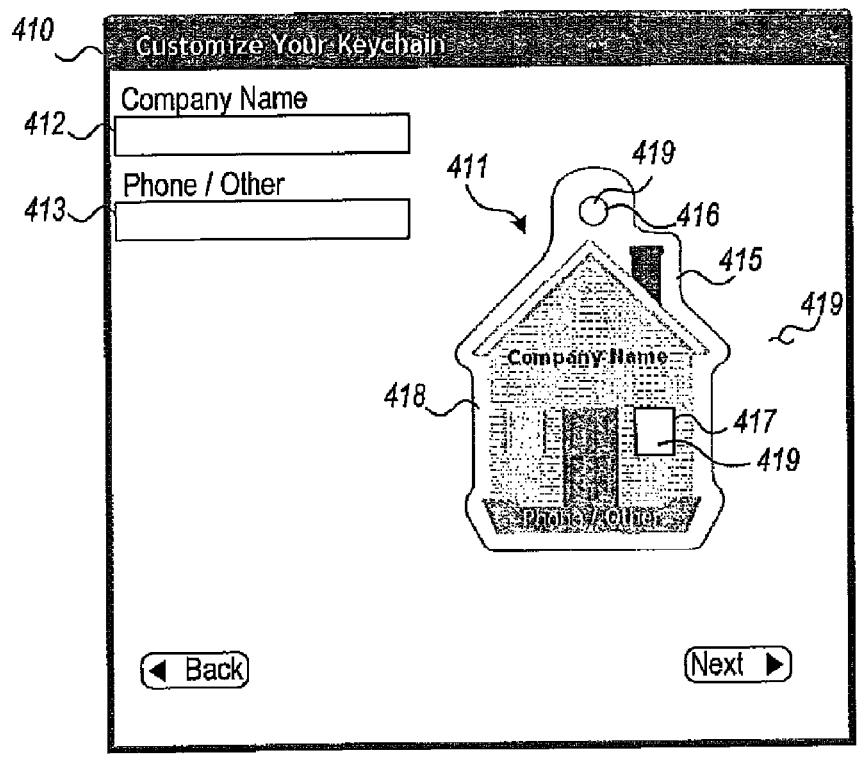
Figure 4C:
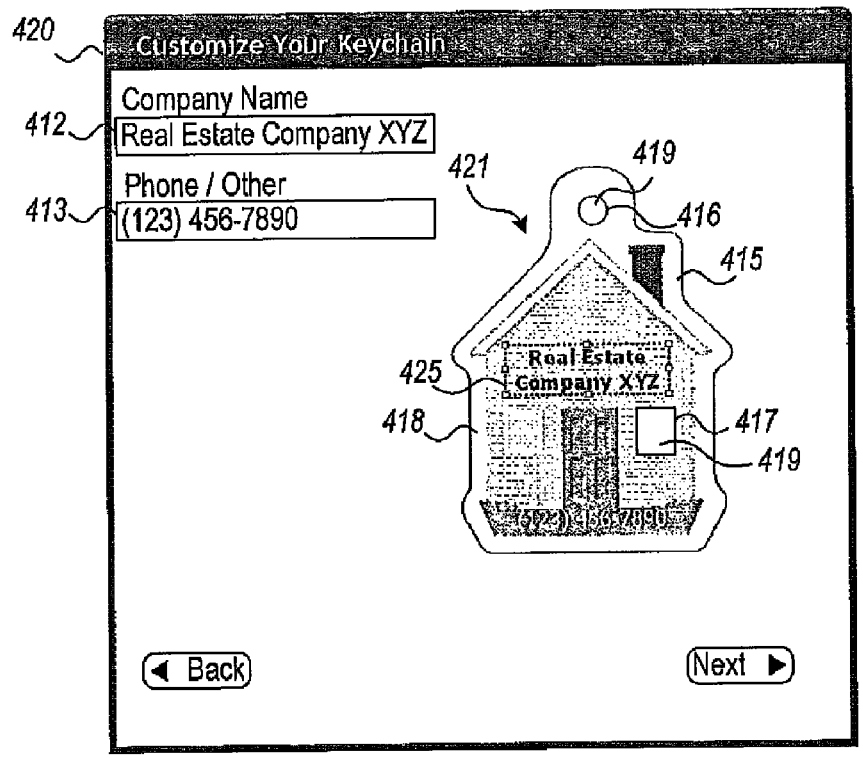

In FIG. 4A, a customer has navigated to the online retailer's website and selected a product—in this case, a keychain—and is browsing a gallery webpage 400 of available keychain design templates. The Browse Designs Page 400 presents sample images of a set of available designs of keychain tags 401a-401 containing various design content, for example a "house" shaped logo 402 in keychain image 401e. As illustrated by the keychain images 401a-401f, the shapes of the keychain tags may vary to conform to the actual content of the design. Upon selection by a customer of a particular design, for example selection of the "house" design shown in image 401e by clicking on a selection link 403, the server 230 serves up a web page 410 shown in FIG. 4B, which displays a preview image 411 of the selected "house" design template. The selected template is the starting point for the customer in designing a final product document (in XML format) which will ultimately be used by the Fulfillment Center Server 240 (FIG. 2) to manufacture the finished keychain. The webpage 420 allows the customer to personalize the design by providing text edit boxes 411, 412 in which the customer can add text to be incorporated into the keychain tag design. FIG. 4C shows a webpage 420 that illustrates the previewing 421 after the customer has added text in the "Company Name" and "Phone/Other" text boxes 412, 413 and a preview tool has updated a preview of the template with the customer-entered information. As illustrated, the customer has entered "Real Estate Company XYZ" in the "Company Name" text box 412 and "(123) 456-7890" in the "Phone/Other" text box 413, and the preview image 421 of the template has been updated to reflect the customer's entries.

Noticeably, the preview image 411, 421 of the customer's product design includes lines 415, 416, 417 indicating the cutlines associated with the template.

Figure 4D:
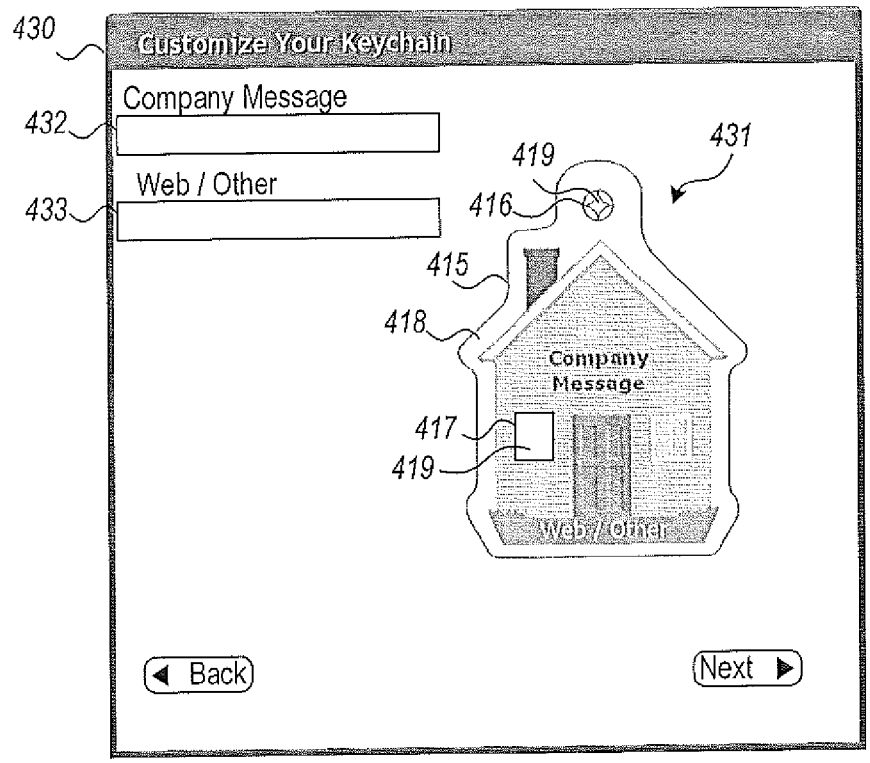
Figure 4E:
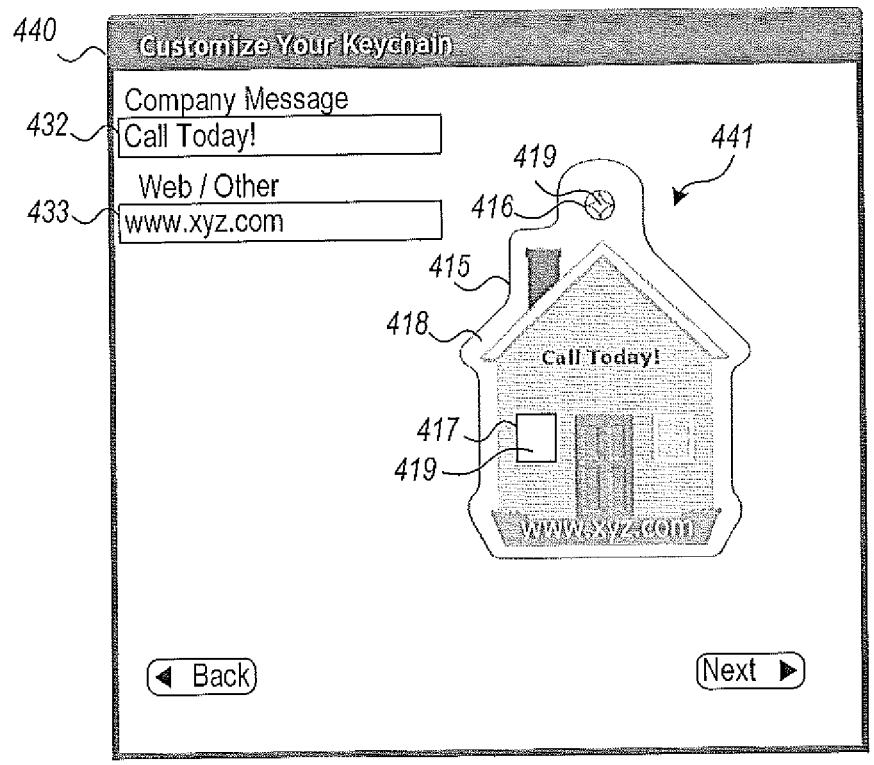

FIG. 4D shows a design tool web page 430 displaying an example of a back side of the keychain tag template. In this example, the back side of the keychain tag template appears similar to the front side template, but the cutlines indicators 415, 416, 417 are flipped horizontally as they would appear when the physical product is turned over. The content of the back side of the template contains a similar house graphic with the chimney flipped to the opposite side. Also in this example, the back side template also includes a text component corresponding to a "Company Message" text box 432 and a text component corresponding to a "Web/Other" text box 433. In FIG. 4D, the text components are provisioned with sample text. In FIG. 4E, the webpage 440 shows that the customer has filled in a company name and message "Call Today!" and web address information in the text boxes 432 and 433 and the preview image 441 has been updated with the customer-entered information.

Figure 4F:
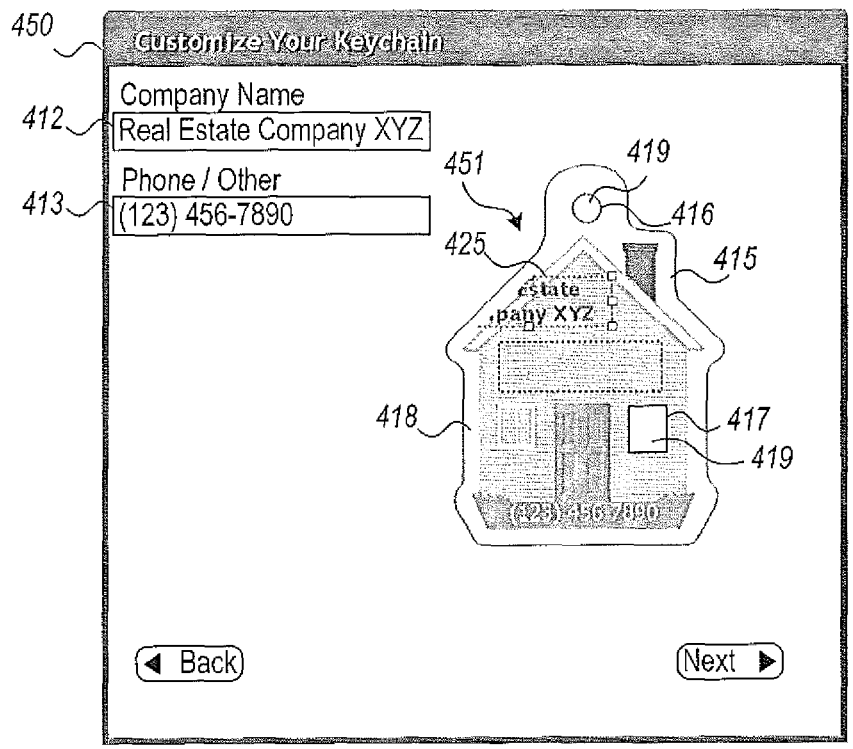

When a customer is personalizing a template prior to ordering, it is desirable to present the preview image in a What You See Is What You Get (WYSIWYG) view. For this reason, the preview image 411, 421, 431, 441 is displayed with outline indicators 415, 416, 417 so that the customer can understand what areas of the preview image correspond to the finished product, and what areas of the preview image will not be included in the finished product. This is important, for example, so that when a customer positions a component such as a text component in a different position in the template, they will be able to see when any portion of that component lies outside of the finished product. For example, FIG. 4F shows a web page 450 showing a preview image 451 of the front side when the customer moves the "Real Estate Company XYZ" text component 425 outside the outer cutlines 415 of the template. The customer can clearly see that portions of the text component 425 will not be included in the finished product because they are outside the outer outlines 415. Additionally, there may be a margin area 418, indicated by the white area, between the cutlines and the graphical content where graphical content is disallowed to account for tolerance in the cutting machines that are used to cut the blanks to the defined shapes. By disallowing graphical content in the margin area 418, the vendor of the product can ensure that at manufacture time, the cutting system will not cut into any graphical content due to cutting system tolerance, and that the preview image 411, 421, 431 441, 451, 461 of the product appears as the finished product will appear. Thus, in the WYSIWYG preview image 411-461, any portions of graphical or text components 425 that are positioned to occupy margin space 418 are not displayed in order to indicate that no content shall be printed in the margin space.

Figure 4G:
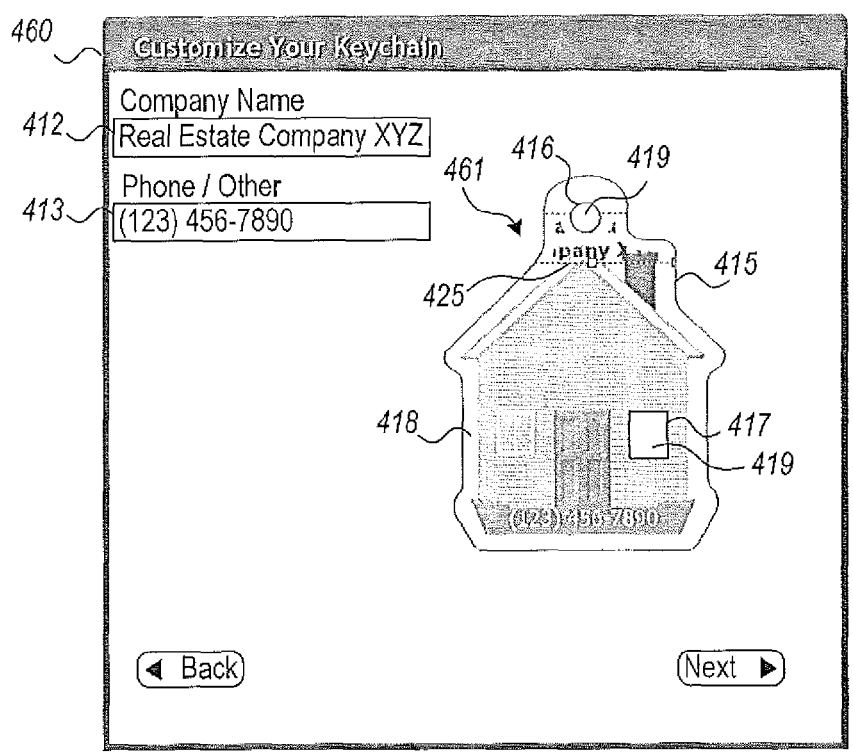

Similarly, as shown in FIG. 4G, any content 425 positioned within an area defined by inner cutlines 416 will also not be visible in the finished product since areas inside of inner cutlines 416 are to be removed by the cutting system. Accordingly, as illustrated in FIG. 4G, in the WYSIWYG preview image, any portions of graphical or text components 425 that are positioned to occupy areas 419 inside of inner cutlines 416 are not displayed in order to indicate that content cannot be visible in the finished product in the corresponding area.

Returning to the order pipeline flow, and assuming that the customer returns the position of the text component 425 to the position shown in FIG. 4C, once the customer is satisfied with the content of the product, the customer may be presented with one or more web pages (not shown) configured to obtain order information such as quantity, shipping address, and payment information, all of which are well-known ecommerce functions. A customer can then place the order for the specified quantity of items, and the order information is provided to a Fulfillment Center server 240 (see FIG. 2) for manufacture of the ordered products and fulfillment of the order.

Returning to FIG. 2, the Generate Demand/Order Pipeline Server 230 implements the order pipeline flow shown in FIGS. 4A-4G. In an embodiment, the server 230 accesses template descriptions 307 and outline descriptions 308 stored in the content database 202 (see FIG. 3), for use by design tool(s) 235 and preview tool(s) 236, which are executed by a processor 231 from program memory 234 of the server 230, to render preview images of a product being personalized by a customer in a customer's browser 213 at the customer's client system 210.

As exemplified in the case of the "house" shape keychain tag selected in the example of FIGS. 4A-4G, the shape of the final product may be determined by the shape of the content to be printed or otherwise affixed to the product. For example, a business advertising its real estate services may create or choose a design including a house logo, and optionally add further customizing design effects such as text and color scheme to the design. The shape of the keychain tag may follow the lines of the "house" logo, resulting in a tag having the shape of a house, which will typically be different than the shape of product blank (or gang cell, to be discussed in detail hereinafter) from which the keychain tag is manufactured.

On the web site it is desirable to display a customer's preview image of their product design in a "What you see is what you get" (WYSIWYG) fashion. To accomplish this, the preview image 411-461 of the product design is displayed with the appropriate cut lines 415-417 and margin areas 418. For example, when a customer's design of a keychain tag is displayed via a preview tool 236, 215 executing at either or both of the Generate Demand/Order Pipeline server 230 or client system 210, no graphical or text components 425 should be rendered in either the margin areas 418 or the cut out areas 419, as these areas correspond to areas of the physical product that will not and/or cannot contain such content. Likewise, when a keychain design is being edited by a customer using a design tool 214, 235, the margin area 418 and the cut out areas 419 should not be active editable areas. If a customer drags text 425 or an image into the margin 418, the portion of the text 425 or image within the margin 418 is not displayed. In an embodiment, the portion of any text or image within the margin is overlaid with a white area.

In order to support this requirement the web site is configured to display custom shaped designs as well as any margin between where design component elements (such as text components and graphics) can be printed or otherwise located and where the product blank (or gang cell, as discussed in detail hereinafter) will be cut to produce the shape of the finished product. In the design tool where the customers personalize a selected template and where the preview image of the personalized product is displayed, customers are presented with an outline of the shape of the product, which corresponds to the outlines, to indicate that content placed outside of the cut lines will not be included in the finished product.

As discussed with respect to FIG. 3, a set of outlines 308 are associated with a template description 307. In an embodiment, the outlines 308 are defined in a markup language format, such as <XML>, which enables a web browser 213 to interpret and render an image 415, 416, 417 of the outlines. In an embodiment, the outlines 308 that define the custom shape of a keychain or other variable shape product design is stored in a table, each entry represented by a outlines identifier as the primary key and a corresponding set of cut lines defining the path of the cuts. Table I illustrates the outlines description database schema:

TABLE I

| column name | column type | description |
| --- | --- | --- |
| cut_line_id | int | A unique ID for the cut line. Primary key for the table. |
| cut_xml | varchar(max) | The XML for the cut lines |

As also discussed with respect to FIG. 3, a set of outlines 308 may be associated with a template description 307 via a link 309. In an embodiment, the links are stored in a table. Table II illustrates the link database schema:

TABLE II

| column name | column type | description |
| --- | --- | --- |
| layout_id | int | Reference to a layout or template description. |
| cut_line_id | int | Reference to a cut line. |
| is_backside | bit | Is this for a backside cut? This controls whether the cut should be flipped about the y-axis. |

Cutline XML Specification

In an embodiment, the format for outlines in XML is similar to the format for Vector Markup Language (VML) vector graphic shapes. In a customer's product document (which is the XML of the template updated by the design tools of the template updated with XML entries specifying the customer-entered text and image entries and other customer-selected changes), the outlines are grouped inside a outlines XML node. In a preferred embodiment, the outline node is nested inside the customer's document in node (i.e., the node describing the entire product design specific to that customer and product).

As discussed previously, a given product design may include more than one type of outline. In an embodiment, the type of cut is defined by a cuttype attribute, which may be one of the different cut types shown in TABLE III.

TABLE III

| "cuttype" | | |
| --- | --- | --- |
| Value | Description | Restrictions |
| keyring | Defines the location of the keyring hole. | One per document. Must be within a certain distance of the outer cut. |
| outer | Defines the outer cut of the keychain. | One per document. |
| inner | Defines an inner cut of the keychain. | Zero or more per document. |

Based on the above schema, a typical cutlines XML description will look like the following example:

Example Cutlines XML

```
<cutlines cutlineid="101">
  <cutline cuttype="keyring" shapetype="oval" name="vpls_cutline_0" style="..."/>
  <cutline cuttype="outer" shapetype="polygon" name="vpls_cutline_1" path="..." style="..." />
  <cutline cuttype="inner" shapetype="rectangle" name="vpls_cutline_" style="..." />
</cutlines>
```

In an embodiment, the cutlines XML are shared for an entire product design document (which begins as the template and gets edited via the design tool 214, 235 to incorporate customer-entered text, images, and/or color/font scheme changes), whereas most of the actual content components (shapes, text, images) are located on a page. Therefore in document XML the outline nodes are contained in the document node.

Below is an example product design document description XML also referred to as an Item Doc:
Example Item Doc

```
<html>
<body>
<vpd def="All">
<info ...>
<!--New items node begins here.-->
    <items>
        <cutlines>
            <cutline ... />
        </cutlines>
    </items>
<!--New items node ends here.-->
<format w="3955" h="1829" o="LandScape" b="41" pnb="1"/>
...
```

Displaying on the Site

Figure 5:
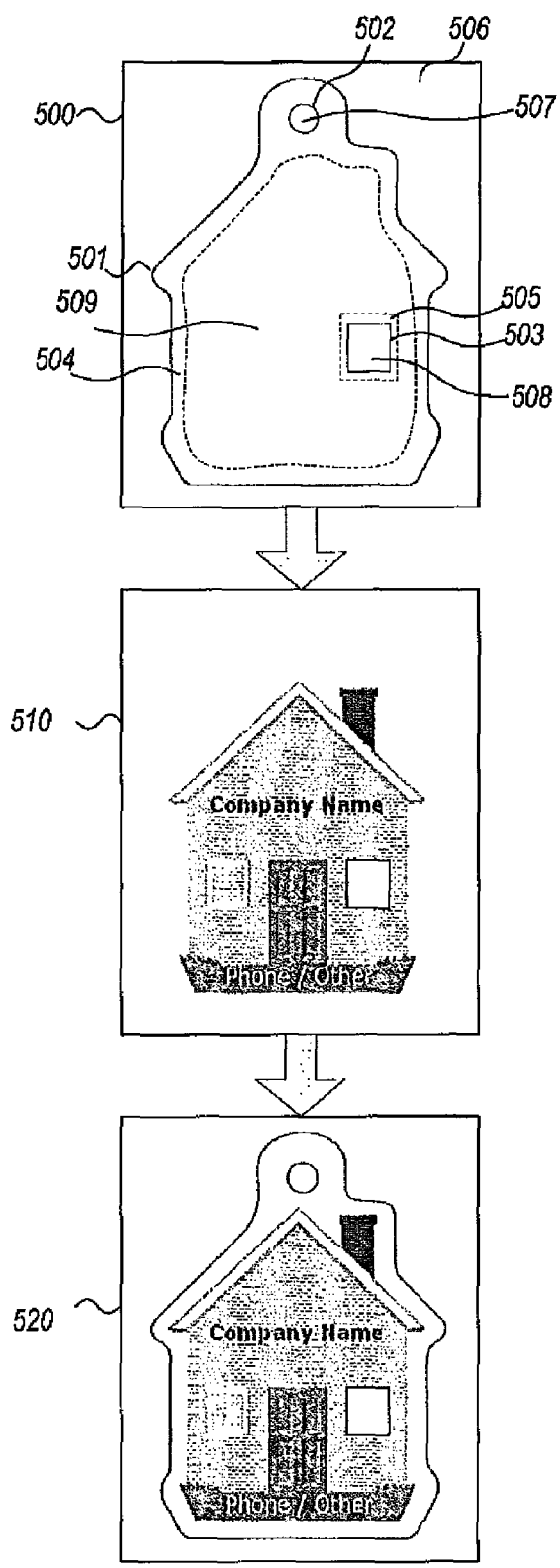
FIG. 5 illustrates an example "overlay" image and a rendering of a template description to illustrate how content is prevented from being displayed in cutaway areas and margins of a product image.

For a given customer's product design (e.g., the document in FIGS. 4B-4G describing the customer's keychain tag), the cutlines description 308 that will be made to create the physical product are stored. On the web site, it is desirable to display the document as it will be manufactured (i.e., in a WYSIWYG rendering). For variable shaped documents, the cutlines XML 308 associated with the template 307 (either unpersonalized before customer personalization, or personalized after customer personalization) are parsed and rendered in a visible indication. In an embodiment, this is accomplished by creating an "overlay" image (for example, a .PNG image) having visible stroke lines such as black lines along the cutlines themselves, and a non-transparent white color drawn in the margin areas, and in areas outside of the outer cutlines and areas inside of the inner cutlines. FIG. 5 illustrates an example "overlay" image 500, along with a template description rendering 510 and a rendering of the overlaying image over the template. The areas 509 (where the user can edit) inside of the margins 504 are transparent in this "overlay" image 500. The design tool 214, 235 places the overlay image 500 on top of the template description rendering 510 so the user cannot see any components in those areas 506, 507, 508 that are not going to be a part of the physical product or that are place inside the margin area 504. Essentially, the overlay image 500 operates to paint over or white out, on the customer's display screen, the portions 506, 507, 508 of the rendered document that lie outside the outer cutlines 501, inside the inner cutlines 502, 503, or within the margin area 504. In an embodiment, the margin areas 504 are wide white strokes that follow the outline vectors 501, 502, 503.

As an example, FIGS. 4B-4G show a preview image of a customer's product design displayed in the customer's browser. The keychain hole 419 is an example of a set of inner cutlines and the area 419 within these inner outlines 416 are whited out by an overlay image 500 to prevent display of any content moved into that area. For example, FIG. 4G shows that when content 425 is positioned in the area 419 of the keyhole, the content 425 within the keychain area 419 is not displayed. Similarly, in FIG. 4F, when content 425 is positioned in the margin area 418 or in area 419 outside the outlines 415-417, the content is not displayed since the overlay image 500 prevents display of any content in these areas.

Figure 6:
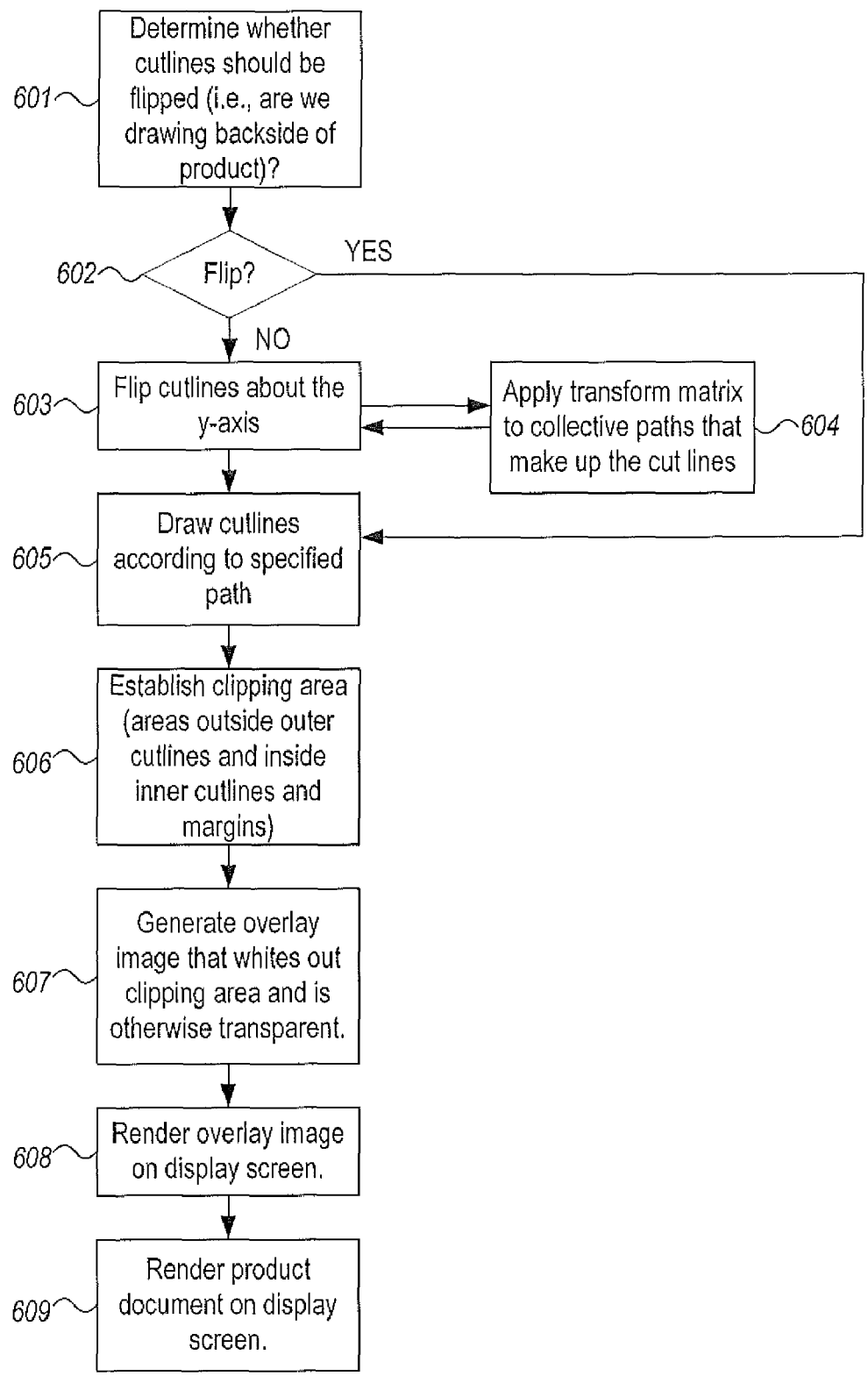
FIG. 6 is a flowchart of an exemplary embodiment for rendering a variable shaped product document in a web browser.

FIG. 6 is a flowchart of an exemplary embodiment for rendering a variable shaped product document in a web browser. When rendering an image of a multisided product document with associated cutlines, the method first determines whether the outlines need to be flipped (step 601). In this embodiment, outlines are defined for the front side of a product document, so when the image of the back side of the document is to be displayed, the outlines need to be flipped about the y-axis (i.e., flipped horizontally). If the cutlines need to be flipped for the current rendering (step 602), the outlines are flipped accordingly (step 603). In an embodiment, this is accomplished by applying a transform matrix (step 604) to the collective paths (outer, inner, keyhole outline paths) which make up the outlines.

As previously described, in an embodiment the outlines are represented in the product document XML as a VML path. The next step is to draw all the cutlines according to their specified paths (step 605). That is, for the front side, the cutlines are drawn according to the corresponding VML path in the outlines XML 38. For the back side, the cutlines are drawn according to the flipped VML path (from step 603). In addition to the path vectors, the outlines includes an additional type attribute ("cuttype") that indicates if the cut is for an outer cut, an inner cut, or the cut for the keychain hole.

Once the outlines are drawn the next step is establish the clipping area for the image (step 606) to ensure that document components such as graphics and images are not drawn in the margins, the keyhole, any other inner holes, and/or outside the product shape. In an embodiment, the cutlines specification may include a margin width that specifies the width of the margin at the edges of the finished product (i.e., around the cutlines) which will not be printed, for example due to cutter tolerances and ink cracking.

Turning now to the Fulfill Demand component 104 of the model of FIG. 1, and in particular the simultaneous mass production of individual orders of variable shaped products, FIG. 7 illustrates an exemplary embodiment of a high-level block diagram of a system 700 embodying the Fulfill Demand component 104 (and Generate Demand component 103) of the retail model of FIG. 1. As shown in FIG. 7, an online retailer offering products available in multiple different shapes provisions the Generate Demand/Order Pipeline server 230 with a website. Product content, such as templates, cutlines, layouts, designs, font schemes, color schemes, images, graphics, available for various products are provisioned into a content database 202 or other computer storage by human or computer designers via a Create Content System 220 (e.g., a personal computer or laptop) and/or one or more content servers.

Any number of customers operating client computers 210 may access the website hosted by the Generate Demand server(s) 230 to view products and product templates and to select, design, and/or customize various design components of a selected product prior to ordering. For example, multiple templates for a product such as a keychain tag may be selectable by the customer (see FIG. 4A) for further customization such as adding customer-personalized information such as name, business name, address, phone number, website URL, taglines, etc. (see FIGS. 4B-4G) Furthermore, the template may include image containers allowing the user to upload images into the design of the keychain tag. Additionally, the keychain tag may be available in various shapes, selectable by the customer. (see FIG. 4A) Once a customer is satisfied with their selections/customizations, they can place an order 203 through the server 230. Orders 203 are stored in an order database 204 and/or sent directly to a fulfillment center. A server 240 at a fulfillment center may retrieve orders 203 from the order database 204, extract individual item documents 701 from the retrieved orders 203, convert the individual item documents 701 into a set of related individual postscript files 702-704, aggregate individual ordered items 701 into a set of related gangs 711, 712, 713 of individual items to be manufactured, and manufactures the items a "gang" at a time.

Manufactured items are sorted by a sorting system back into their individual orders, packaged by a packaging system 760 and shipped or otherwise delivered to the respective individual customers.

System 700 is configured for mass production of customized printed products or items that may be of differing shapes. In this system, mass production includes the simultaneous printing of multiple items ordered from potentially multiple different customers and containing potentially different content and of potentially different shapes, followed by the simultaneous cutting of the printed items. In other embodiments, the printing step may be unnecessary for the particular application and may be bypassed altogether. In the context of the present invention, the discussion is focused on the simultaneous manufacture of keychain tags printed with potentially differing content and differing shapes as received from orders received via an online retail website (hosted by server 230) from potentially thousands or more different customers in any given time period. The keychain product in this context includes a keychain tag. The keychain tag is formed of a consistently flat sheet of substrate which is printed with a design selected by the customer and cut to a shape associated with the selected design. In an embodiment, the keychain tag substrate is a soft polyvinyl chloride (PVC) or other stiff or semi-stiff material.

In the system shown in FIG. 7, a potentially enormous number (e.g., thousands or even hundreds of thousands or millions) of individual and commercial customers, wishing to place orders for one or more instances of various different shaped products having a various graphical and customized designs printed or otherwise affixed thereon, access the system over a network 250. In the illustrative embodiment, customers operating respective client computers 210 may access the system over the Internet or other network 250 via web browsers 213 (or similar interactive communication software) running on personal computers 210 or other electronic devices.

In general, the orders 203 submitted by customers are short run manufacturing jobs, i.e., manufacturing jobs of products of a particular design and shape of less than 40,000 units, typically 1-5,000 units). Through the network 250, each customer can access a website comprising a plurality of related web pages 233, 235 configured to allow a customer to select and customize a graphical design or template to be printed, etched, engraved, stamped, affixed, or otherwise embodied on a product (e.g., keychains, mousepads, magnets, decals, sticky notes, business cards, brochures, etc.). A product may be available in multiple different shapes from which the customer may select. For example, where the selected product is a keychain, the keychain tag may be available in a plurality of different shapes (see FIG. 4A) Design tool(s) 214, 235 software may execute directly on the Generate Demand/Order Pipeline server 230, or may be downloaded from the server 230 as part of web pages 233 displayed to the user to run in the user's browser 213 on the customer's computer 210. In an embodiment, the design tool(s) 214, 235 enable the user to perform simple design functions by completing a selected template using a Design Wizard, or more complex design functions using a Design Studio, locally in the browser. In an embodiment, the templates are embodied using an XML format or other appropriate format.

Once the customer has completed customization of the product template design, the customer places an order. At this point the customized product design template is referred to as an item document 701. An item document 701 is a document description of an ordered item, and in one embodiment is stored in an XML format. Such as the Ex Item Document previously presented. Placement of an order results in a collection of information associated with the order. The collection of information is referred to herein as an order object 203. The customer's item document 701 is sent to the Fulfillment Center server 240. In an embodiment, the item document 701 is sent to the Fulfillment Center server 240 in XML format, and the XML file is then converted by rendering software 241 at the server 240 into a set of associated PostScript files print-ready such as an Adobe® .pdf or other such PostScript file.

The Fulfillment Center server 240 may include scheduling software 241. The scheduling software 241 operates to schedule the production of finished products based on characteristics of the received orders 218, such as shipping time, type of product, etc.

Rendering software 242 converts item documents from the web format (e.g., <XML> or Document Object Model (DOM) descriptions) used in the web browser for displaying the web view of the design as seen by the customer during the design process to an associated set of print-ready (i.e., manufacturable) files 702, 703, 704 such as a Postscript (e.g., .pdf) file ready to print by a printing press and a cutter-ready file such as a Postscript (e.g., .pdf) file ready to cut by a cutting system.

Figure 8:
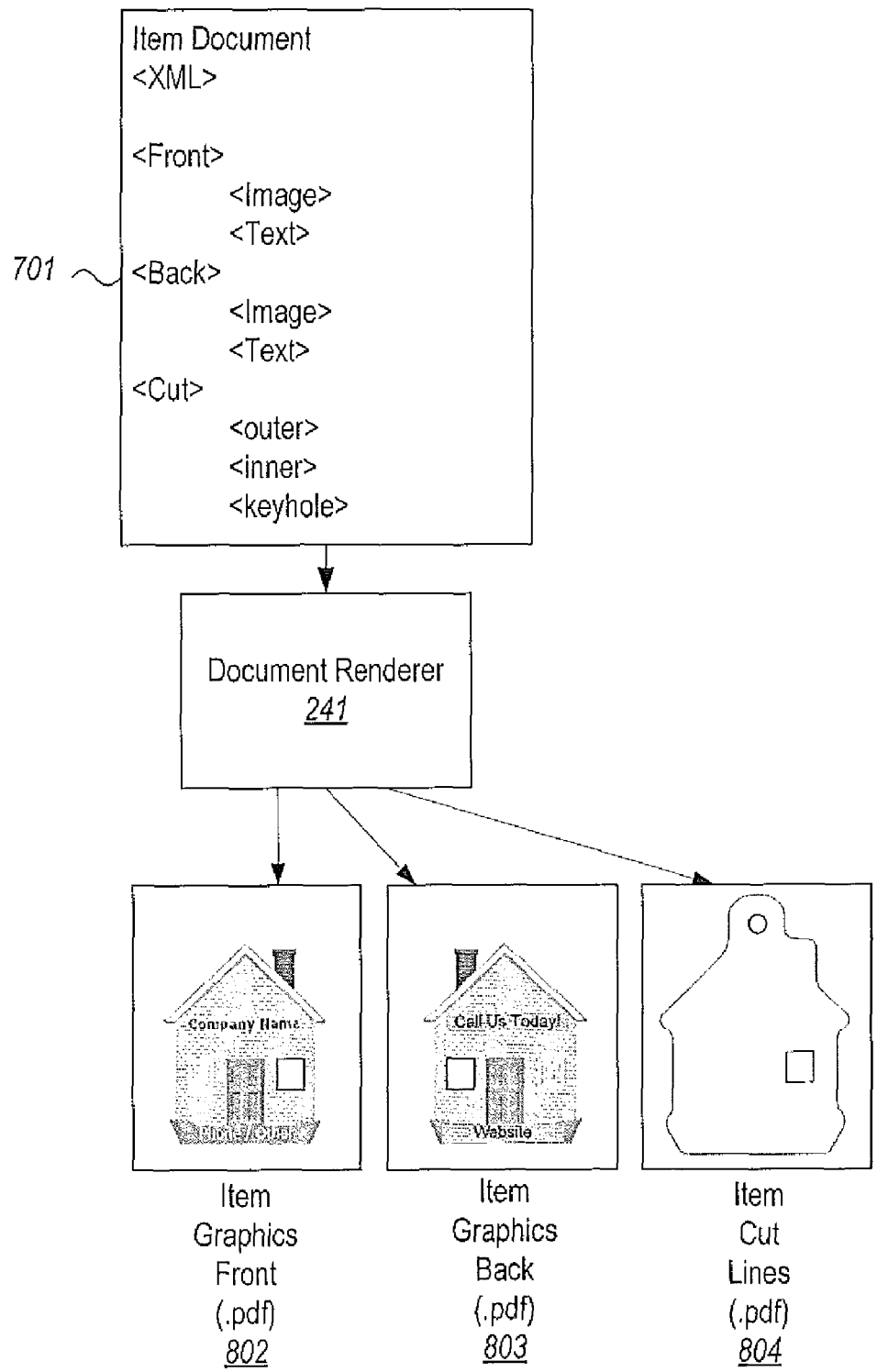
FIG. 8 is a diagrammatic representation an exemplary embodiment of the operation of the rendering software of FIG. 7.

FIG. 8 diagrammatically represents an exemplary embodiment of the operation of the rendering software 241. In this embodiment, the rendering software 241 receives an item document 701 in an XML format, and renders it into an item graphics front Postscript file 703 such as .pdf file of the front side content to be printed by the printer, an item graphics back Postscript file 703 such as .pdf file of the back side content (if printing is to performed on the back side of the products) to be printed by the printer, and an item cutlines Postscript file 704 such as .pdf file of the outer and inner cutlines to be cut by the cutting system.

Both the printing system 730 and the cutting system 740 can print or cut directly from respective the Postscript files 702, 703, 704 without requiring additional file processing.

Returning to FIG. 7, a ganging system 710 executing the Ganging software automatically aggregates, or "gangs together" respective individual rendered files 702, 703, 704 (e.g., .pdf files) associated with the items being manufactured with multiple other items to be manufactured and which may be associated with potentially multiple other customer orders, to produce a set of associated gang files 711, 712, 713. One gang file 711 contains the frontside graphics of multiple different items to be simultaneously printed on the frontside of a sheet of material by a printing system. Another gang file 712 contains the backside graphics of the same multiple different items to be simultaneously printed on the backside of the sheet of material. A third gang file 712 contains the outlines of multiple different items to be simultaneously cut by the cutting system 740.

A gang is a grouping of individual postscript items that can all be either printed together in the same pass through a printing press or cut together in the same pass through a cutting system. The process of choosing which individual postscript items are part of a gang is called "ganging." Ganging leads to efficiencies on equipment with high setup costs and low run costs. It spreads the setup cost of a print and cut job across many orders.

Gangs are generated by the ganging system 710 by filling up gang templates. In an embodiment, and with reference to FIGS. 9A through 9E, individual item postscript files are arranged in a layout according to a predefined gang template 800. A gang template 800 is a postscript file such as a .pdf file defining a plurality of pre-positioned empty cells 801. A cell

801 is a content container of pre-defined dimensions corresponding to a product blank and positioned in the gang file layout in a unique pre-defined location in the gang template 800. Each empty cell 801 may be filled with a single PostScript item file 702, 703, 704, or 705 to be printed or cut. Only PostScript item files of the same type (e.g., front side only, back side only, or outlines only) can be placed in the same gang.

In the examples shown in FIGS. 9A-9E, each of the associated gang templates 810, 820, 830 includes 56 cells 801 of identical size arranged in 7 rows and 8 columns. Each cell 801 corresponds to a product blank (e.g., a keychain tag blank), which is part of a larger sheet of PVC or other material substrate. The cell layout shown in FIGS. 9A-9E is representative only and contains fewer cells than may be implemented in practice. For example, in one embodiment (not shown), the gang sheet is 49"×25", and there are up to 192 keychain tag blanks on a gang. The keychain blanks are arranged in 12 rows and 16 columns. Each keychain tag blank is 3"×2". In a gang template 800, the cells 801 correspond to a product blanks.

Figure 9A:
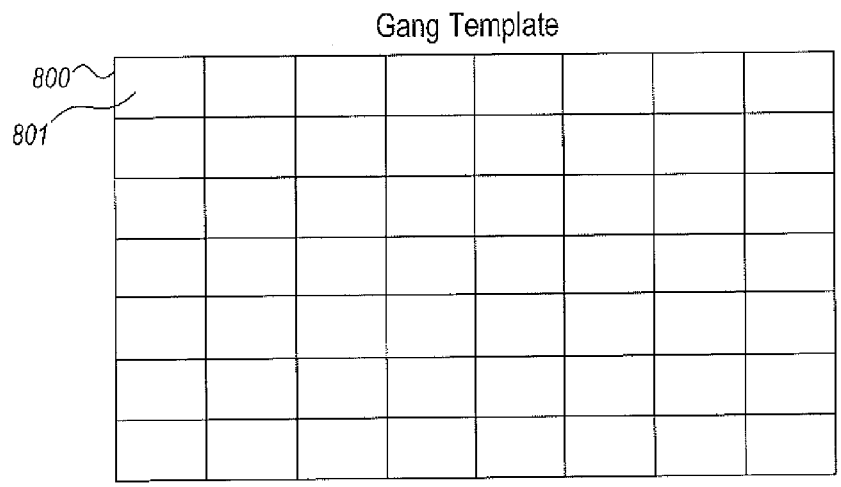
FIGS. 9A-9E are example embodiments of gang templates.
Figure 9B:
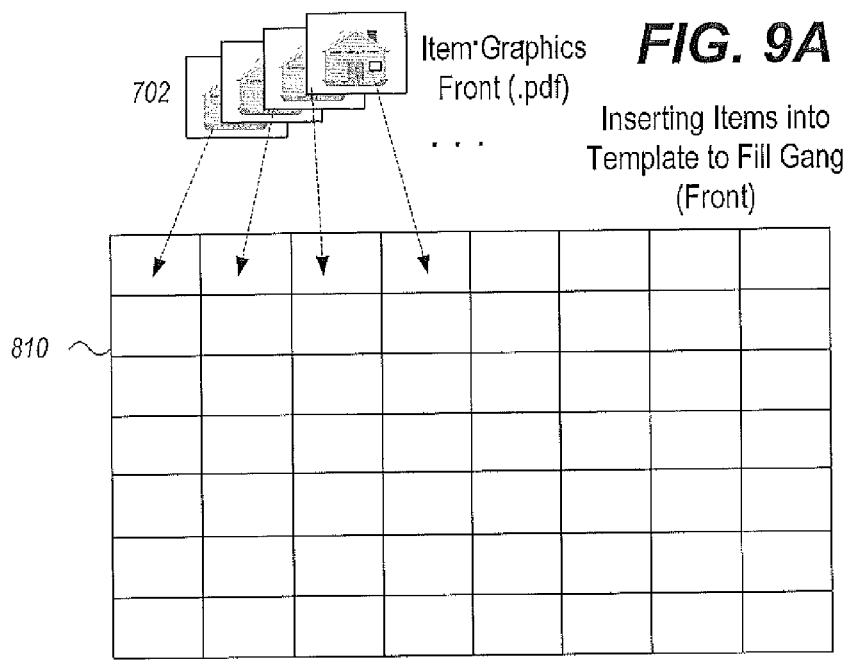
Figure 9C:
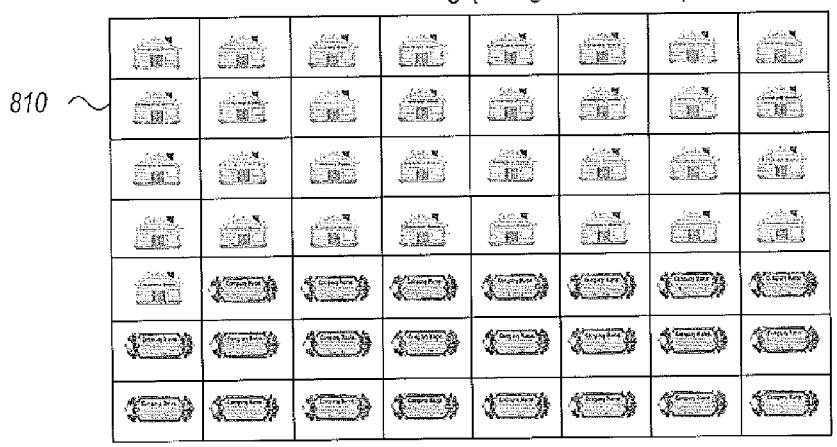
Figure 9D:
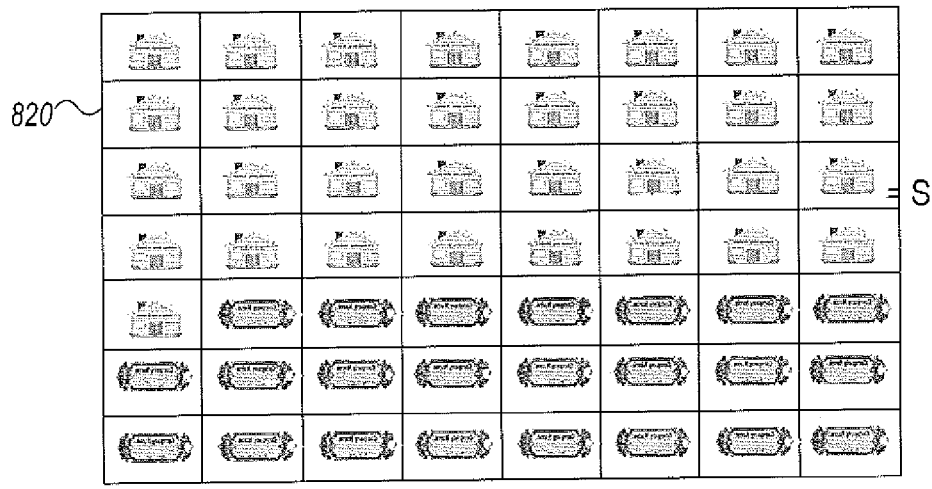
Figure 9E:
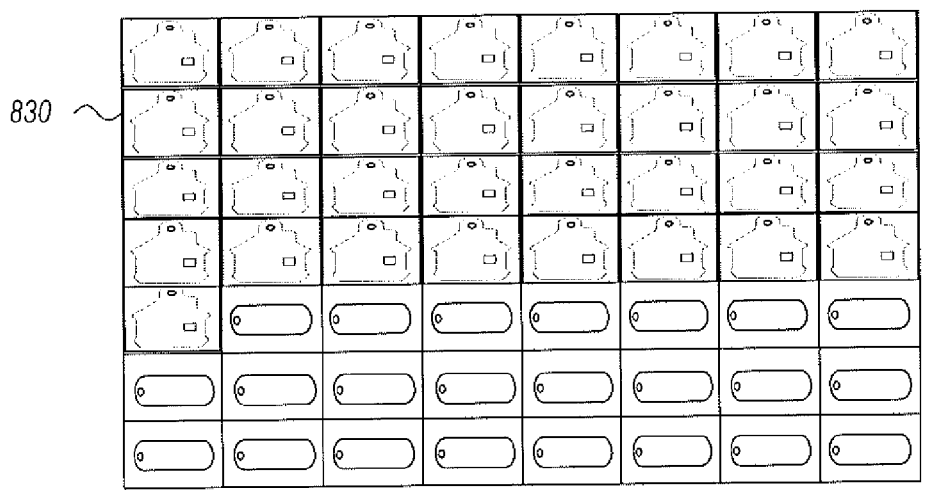

The cells 801 in a gang template 800 are filled according to an automated ganging algorithm, executed within the ganging system 710. The production of variable shaped products will typically require the generation of a set of associated gangs, including at least a front side gang 810 (FIGS. 9B and 9C) and an associated cutlines gang 830 (FIG. 9E), and if content is printed on the back sides of the products, it will also require the generation of an associated back side gang 820 (FIG. 9D). As previously described with respect to FIG. 7, each item to be manufactured has associated with it an item graphics front file 703, optionally an item graphics back file 704, an item outlines file 705, and optionally an item keyhole file 706.

The ganging system 710 selects a gang template 800 appropriate to a particular product (e.g., a keychain template) and instantiates a gang template for each of the front side 810, back side 820 (if the back side will be printed), and cutlines 830. Each of these templates 810, 820, 830 is associated with one another. The ganging system 710 selects items scheduled for production and begins filling corresponding cells of the associated gang templates 810, 820, 830 with the corresponding individual item graphics front file 702, item graphics back file 703 (if exists), and item outlines file 704. As illustrated in FIG. 9B, the ganging system 710 is configured to fill corresponding cells in associated gang templates 810, 820, 830 with the individual .pdf files associated with the same ordered item. That is, if an ordered item is assigned for production to a cell 803 of a gang template 800, the item graphics front file 702 generated from a given item document 701 will be inserted into cell 803 of the front side gang template 810, and the item graphics back file 703 generated from the same item document 701 will be inserted into corresponding cell 803 of the back side gang template 820, and the cutlines file 704 generated from the same item document 701 will be inserted into corresponding cell 803 of the cutlines gang file 830.

The associated gang templates are preferably filled to capacity (by filling each cell 801 with a pdf of the same type from items scheduled to be manufactured) or may only partially fill the associated gang templates for other reasons (such as meeting critical shipping deadlines when insufficient orders exist to fill the associated gang templates). In either case, when the ganging system 710 determines that all items that will be ganged together have been added to the associated gang templates 810, 820, 830, it converts (if necessary) and saves the filled associated gang templates 810, 820, 830 into respective associated gang files 711, 712, 713. That is, the ganging system generates each of a single PostScript file 711 (e.g., a single .pdf) containing the front side content of multiple different keychain tags, a single PostScript file 712 containing the corresponding back side content of the same multiple different keychain tags, and a single PostScript file 713 containing the corresponding outlines of the same multiple different keychain tags. Each of these gang files 711, 712, 713 are associated with one another and are together used by the printing system 730 and cutting system 740 to simultaneously manufacture multiple different items that may be associated with multiple different orders and may contain multiple different content and may be cut into multiple different shapes.

If the ordered quantity of finished products associated with an item document is more than one, then additional instances of the rendered item graphics front PostScript file 701, item graphics back PostScript file 703, and item outlines PostScript file 704 may be placed in additional cells of the associated gang templates 810, 820, 830 to manufacture the ordered quantity of products. Alternatively, or in addition, additional gang sheets may be printed and cut based on the associated gang files 710, 720, 730 to manufacture the desired ordered quantity of any given item.

The front side gang file 711 and back side gang file 712 are sent to the printing system 730 (e.g., a printer or a printing press such as an offset press) and printed onto a single sheet 731 of substrate (such as a sheet of PVC) to produce a printed gang sheet 732. If a back side is to be printed, a printed gang sheet 732 may be fed back to the printing system 730 to print the back side of the sheet.

The printed gang sheet 732 and the outlines gang file 713 are sent to a cutting system 740 which cuts the printed gang sheet 732 into individual finished products 733 (e.g., keychain tags). The finished products 733 are sorted by a sorting system 750 into individual orders. Additional post-print processing, such as affixation of labels or binning an item while waiting for additional items belonging to the order may be performed. The filled orders are then packaged by a packaging system 760 and shipped/delivered to the respective customers.

The packaging system may include weight calculation software 761 which allows automatic calculation of the weight of a product without actually having to weigh the product. The weight calculation software 761 takes advantage of the fact that for products that are manufactured from a flat sheet of substrate, such as the keychain tags manufactured from a flat sheet of PVC described herein, at least one dimension (in this case, the thickness) of the product presumably does not vary. Accordingly, the weight of the product can be determined by determining the ratio of the surface area of the product in the variable 2 dimensions relative to the total surface area of a product blank.

Figure 10A:
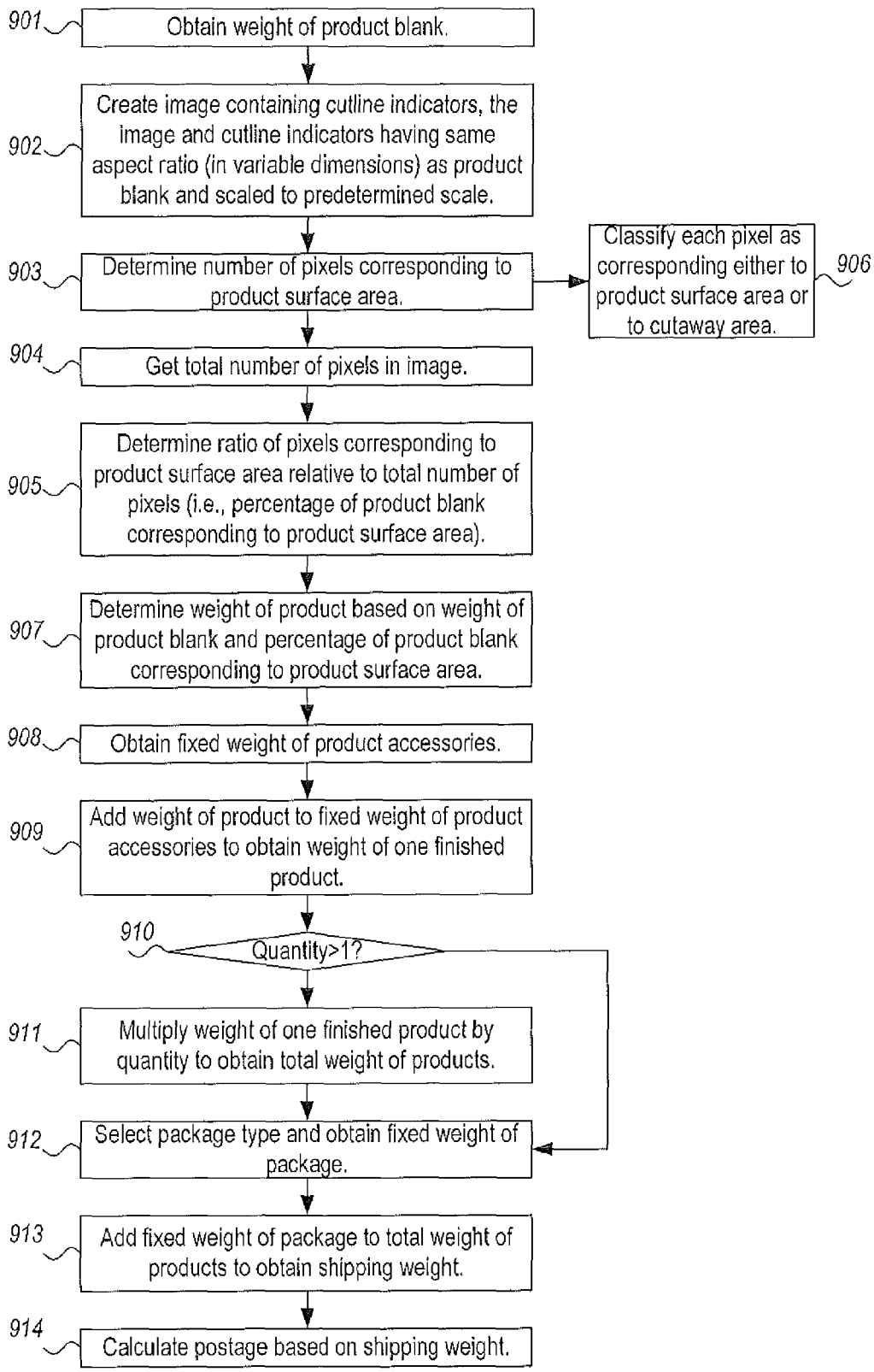
FIG. 10A is a flowchart illustrating an exemplary method for determining a weight of a variable shaped product.

FIG. 10A is a flowchart illustrating an exemplary method for determining a weight of a product having a shape characterized by a variable first dimension and a variable second dimension and a non-variable third dimension. That is, the shape of the finished product varies along 2 dimensions and is of a constant thickness in the third dimension. As illustrated in FIG. 9A, the weight of a product blank is obtained (step 901). An image is created (step 902) such that the image has an aspect ratio that matches the aspect ratio in the variable two dimensions of a product blank, and whereby the image is scaled to a predetermined scale. The content of the image includes pixels indicating and corresponding to locations of the cutlines of the product, rendered according to the predetermined scale. Pixels located in the area of the image inside of the outer cutlines and outside of any inner cutlines correspond to product surface area. Pixels located in the area of the image outside of the outer outlines and inside of any inner cutlines correspond to cutaway area.

The ratio of the number of pixels corresponding to product surface area to total number of pixels in the image is determined (steps 903-905). In an embodiment, the image is processed pixel by pixel. Each pixel is classified as corresponding to product surface area or to cutaway area (step 906). The total number of pixels is either known or counted during this process (step 904). When all pixels have been processed, the total number of pixels corresponding to product surface area is known, and the ratio of the pixels corresponding to product surface area relative to total number of pixels is determined (step 905). This ratio also corresponds to the percentage of surface area of the product blank that contributes to the weight of the finished product. This ratio or percentage can be multiplied by the weight of the product blank to obtain the weight of the finished product (step 907) without having to actually weigh the manufactured product at the packaging station.

If the manufactured product is to be shipped with accessories (for example, a keyring may be shipped with a keychain tag), then the fixed weight of the accessories is obtained (step 908) and added to the determined weight of the manufactured product (from step 907) to obtain the weight of a single finished product (step 909). If more than one of the same product is to be shipped, the weight of the single finished product is multiplied by the quantity of identical items to be shipped (step 910).

Optionally, the weight of the package can also be added to determine the final shipping weight. If desired, a package type is selected and its fixed weight determined (step 912) and then added to the total weight of the finished products (determined in step 911) to obtain the shipping weight (step 913). Postage may be calculated based on the shipping weight (step 914).

FIG. 10B illustrates the process diagrammatically. As illustrated, outline indicators are placed in an image having the same aspect ratio as the product blank. The cutlines are scaled in proportion to the amount of scaling of the image relative to the size of the product blank. The pixels between the outer cutlines and inner cutlines are counted as product surface area.

The method of FIG. 10A is preferably implemented as program instructions stored in computer readable media that are read and executed by one or more processors to automatically determine the shipping weight and postage for the order. Accordingly, the packaging system 760 is preferably a computerized system including one or more processors, program and data memory, and communication means for receiving order and shipping information. Although the weight calculation software 761 may be implemented directly at the packaging systems 760, it may also be implemented and executed on any server in the entire system 700 and the product weight, the order weight, the shipping weight, and/or the postage may be sent to the packaging system from a remote system.

Figure 11:
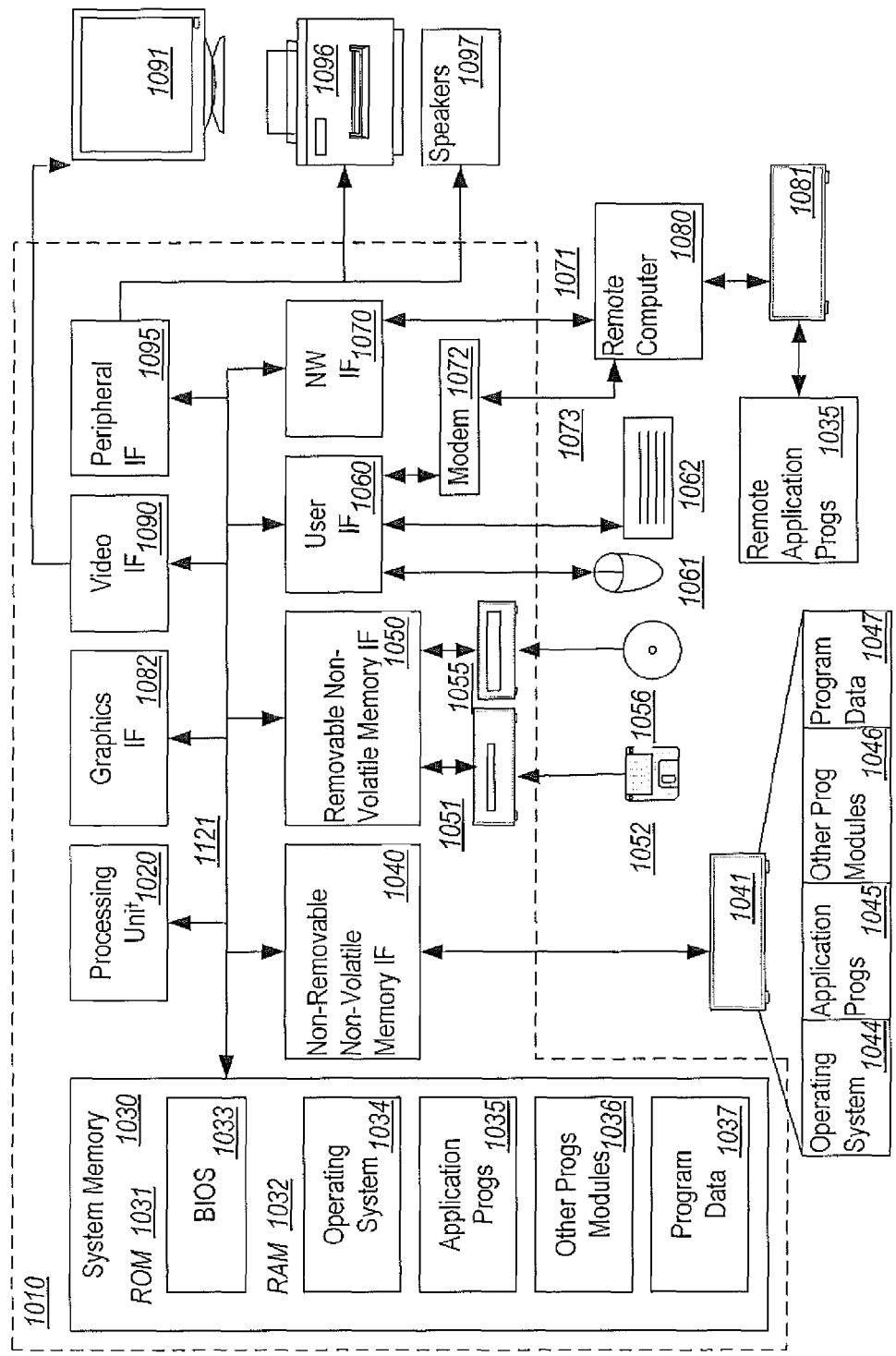
FIG. 11 is a block diagram of a computer system which may be used to implement computing features of the invention.

FIG. 11 illustrates a computer system 1010 that may be used to implement any of the servers and computer systems discussed herein. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 1010. Computer storage media typically embodies computer readable instructions, data structures, program modules or other data.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 11 illustrates operating system 1034, application programs 1035, other program modules 1036, and program data 1037.

The computer 1010 may also include other removable/non-removable, volatile/nonvolatile computer storage media. By way of example only, FIG. 11 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 11 provide storage of computer readable instructions, data structures, program modules and other data for the computer 1010. In FIG. 11, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 11. The logical connections depicted in FIG. 11 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 11 illustrates remote application programs 1085 as residing on memory device 1081. It will be appreciated that the network connections shown are exemplary and other means of establishing a communications link between the computers may be used.

FIG. 12 is a flowchart illustrating an exemplary method for producing variable shaped printed products. As illustrated, the method includes receiving a plurality of orders 203 for items to be manufactured (step 1101). In an embodiment, the items to be manufactured are items to be both printed and cut, but the items could also be items that only need cutting. Items to be printed have an associated print design. All items have an associated set of cutlines defining a shape for the manufactured item. A set of received items are selected (step 1102) to be simultaneously produced. In an embodiment, at least some of the selected print items have associated sets of cutlines that define different shapes (i.e., the shape of items in a selected set are not the same). Individual print-ready print files of the associated print design for each of said selected print items are rendered (step 1103) (where printing will be performed). Individual cutter-ready outline files corresponding to the associated set of cutlines for each of the selected items are rendered (step 1104). Individual print-ready files 702, 703 associated with the selected items are inserted into respective individual cells of a print gang 810, 820 (step 1105). As described previously with respect to FIGS. 9A-9E, a print gang template 810 comprises a pre-determined number of cells 801 each in a pre-determined position and each cell configure to receive print-ready content 702. Similarly, individual cutter-ready files associated with the selected items are inserted into respective individual cells of a cutlines gang 830 (step 1106). Upon filling the print and outlines gang templates, the print gang file is rendered (step 1107) and the cutlines gang file is rendered (step 1108). The print gang file(s) 810, 820 are sent to a printing system to print the content of the print gang file onto one or more sheets of substrate (step 1109). The printed gang sheet(s) are then sent to a cutting system along with the cutlines gang file, which cuts the individual items into the finished products (step 1110).

FIG. 13 is a flowchart illustrating an exemplary method for defining a variable shaped document for web viewing, for example, with respect to creating the overlay image described in FIGS. 5 and 6. In this method, a markup language description 308 of cutlines defining a shape of an item to be produced is defined (step 1201). A markup language description of a margin area defining a margin between the defined cutlines and content area within the defined shape may also be defined (step 1202). A markup language description of content to be displayed within the boundaries of the outlines may also be defined (step 1203). Rules (i.e., the XML document) that prevents display of the content in areas on a display screen outside the defined shape of the item to be produced are also defined (step 1204). Cutline indicators and the content are displayed on a display screen according to said defined rules (step 1205).

Those of skill in the art will appreciate that the invented method and apparatus described and illustrated herein may be implemented in software, firmware or hardware, or any suitable combination thereof. Thus, those of skill in the art will appreciate that the methods and systems described herein may be implemented by one or more processors executing computer-readable instructions being stored for execution on one or more computer-readable media. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for determining a weight of a product having a shape characterized by a variable first dimension and a variable second dimension and a non-variable third dimension, the shape defined in the first and second dimensions by a set of outlines, the method comprising:
   obtaining a weight of a product blank;
   creating an image having an aspect ratio that matches a corresponding aspect ratio of a product blank in the first and second dimensions, the image scaled to a predetermined scale, the image having pixels corresponding to locations of at least the cutlines defining the variable shape of the product scaled to the predetermined scale, the cutlines delineating pixels corresponding to points on the final product and pixels corresponding to areas of the blank to be trimmed from the product blank;
   determining a ratio of a number of pixels corresponding to product surface area to total number of pixels in the image; and
   multiplying the determined ratio by the weight of the product blank to determine the weight of the product.

2. The method of claim 1, further comprising:
   obtaining a fixed weight of accessories to be shipped with the product; and adding the fixed weight of the accessories to the determined weight of the product to obtain the weight of a single finished product.

3. The method of claim 2, wherein if more than one of the single finished product is to be shipped, multiplying the weight of the single finished product by a quantity to be shipped to obtain the total weight of the products.

4. The method of claim 3, further comprising:

selecting a package type;

obtaining a fixed weight of the package type; and adding the fixed weight of the package type to the total weight of the finished products to obtain the total shipping weight.

5. The method of claim 4, further comprising:

calculating postage based on the shipping weight.

6. The method of claim 1, further comprising:

selecting a package type;

obtaining a fixed weight of the package type; and adding the fixed weight of the package type to the weight of the product to obtain the shipping weight.

7. The method of claim 6, further comprising:

calculating postage based on the shipping weight.

8. One or more computer readable storage medium together tangibly embodying program instructions which, when executed by a computer, implement the method of claim 1.

9. A system, comprising:

one or more processors;

one or more computer readable media embodying program instructions executed by the one or more processors to implement the method of claim 1.

* * * * *

UNITED STATES PATENT AND TRADEMARK OFFICE
CERTIFICATE OF CORRECTION

PATENT NO.       : 8,238,643 B2
APPLICATION NO.  : 12/607911
DATED            : August 7, 2012
INVENTOR(S)      : Samuel R. Niles Peretz et al.

It is certified that error appears in the above-identified patent and that said Letters Patent is hereby corrected as shown below:

On the title page, in item (75), line 3, please delete "Terence M. Tirrella" and insert
--Terence M. Tirella--.

Signed and Sealed this
Fourth Day of December, 2012

David J. Kappos
*Director of the United States Patent and Trademark Office*